May 1, 1951     H. H. STAUB     2,550,878
PULSING CIRCUIT

Filed Nov. 19, 1948     3 Sheets-Sheet 1

WITNESSES

INVENTOR.
Hans H. Staub
BY

A

B

C

D

E

Patented May 1, 1951

2,550,878

UNITED STATES PATENT OFFICE 2,550,878

PULSING CIRCUIT

Hans H. Staub, Palo Alto, Calif., assignor to the United States of America as represented by the United States Atomic Energy Commission Application November 19, 1948, Serial No. 60,944

1 Claim. (Cl. 250—36)

The present invention relates to electronic pulsing systems and more particularly to such systems wherein the amplitude of the output pulses may be made to vary cyclically in accordance with predetermined patterns.

While many pulsing systems have been described heretofore for calibrating, testing and other purposes, the same have been deficient in certain respects when employed, for example in the calibration of many types of multichannel electronic instruments or systems. Such prior pulsing systems or signal generators have been generally designed to produce output pulses of predetermined frequency and have controlled the amplitude to preselected values by means of suitable attenuators. It is apparent that while the employment of such signal generators for the calibration or adjustment of frequency responsive instruments is widespread, their use in connection with amplitude responsive systems of the multichannel type is possible under conditions which extend the time required for calibration or adjustment. Continuous and simultaneous calibration over the entire amplitude spectrum is impossible.

It is thus seen to be an object of the present invention to provide a simple pulsing system in which the amplitude of the output pulses may be made to vary cyclically in accordance with a predetermined pattern.

It is a further object of the present invention to provide a signal generator system in which in addition to variability of the frequency of the output signal, the amplitude thereof may be made continuously and cyclically variable.

Other objects and advantages will be apparent to one skilled in the art from the following description taken in connection with the drawings (made part of this specification) of a presently preferred embodiment.

Figure 1:
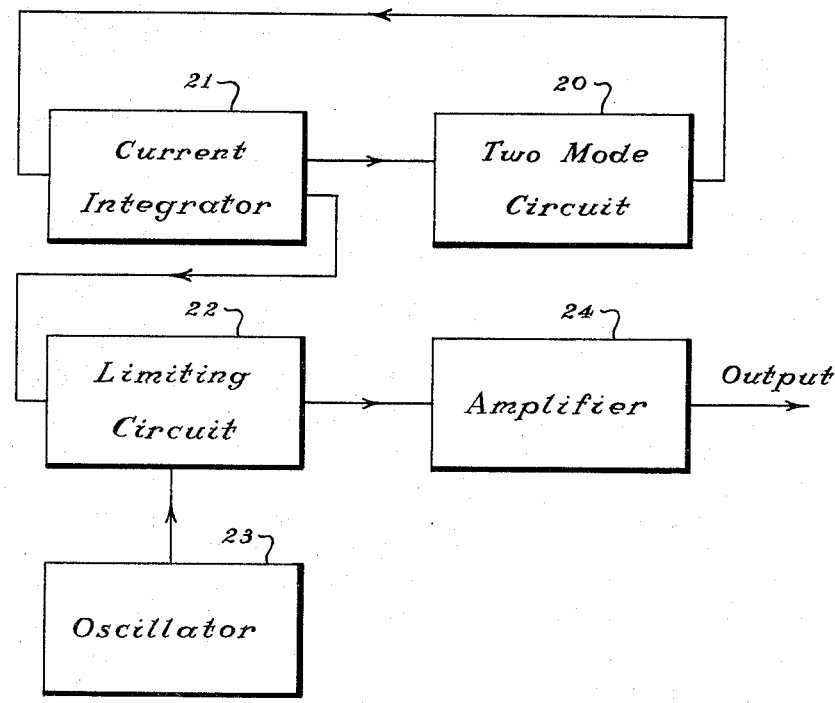
Figure 1 illustrates in block diagram form the component circuits and the interrelation thereof in the present invention.

Referring now to Figure 1, the pulsing system of the present invention is seen to comprise five main components, namely, integrator 21, a circuit operable in two stable modes of balance referred to herein as a two mode circuit 20, a limiting circuit 22, oscillator 23, and an output amplifier 24.

Two mode circuit 20 may be of any well known type which operates in two stable states which for the purposes of the present description are designated as positive and negative. In either state of the two mode circuit a pulse characterized by a vertical rise or fall is produced at the output depending upon the arrangement of the circuit elements indicating that the circuit is adapted to shift rapidly from one mode of balance to the other in response to a suitable input signal. This step wave is impressed upon the input element of the integrator circuit 21 (which is also of any well known type) wherein it is converted to a linear pulse either rising or falling depending upon whether the input pulse from two mode circuit 20 is positive or negative. As shown in the drawing one output from the integrator is applied back to two mode circuit 20, the same being accomplished in a manner to cause the shift from one mode of balance of said circuit 20 to the other and thus in turn to change the polarity of the input to and the linear output from said integrator 21.

The second output from integrator 21 is applied to a limiter circuit 22, e. g. a diode clipper circuit, so that the limiting characteristics of said limiting circuit vary in accordance with the linear pulse applied thereto. Said limiter 22 is interposed between an oscillator 23 adapted to oscillate at any predetermined frequency and an amplifier 24 in such a manner that the output pulses from said oscillator pass through said limiter 22 wherein the amplitude is limited in accordance with the cyclic variation of the output from integrator 21 to limiter 22. Amplifier 24 need not be of the high gain type, its purpose being to provide an additional control of the output amplitude.

Figure 2:
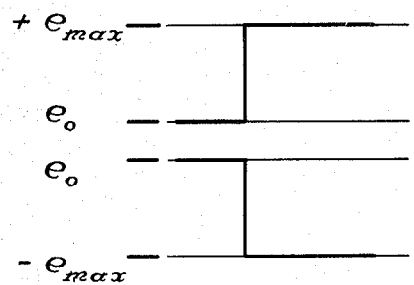
Figure 2 shows in chart form the pulse shapes put out by the above-mentioned component circuits.
Figure 2:
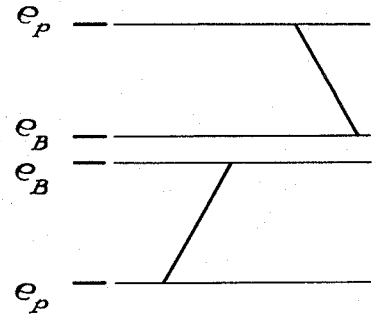
Figure 2:
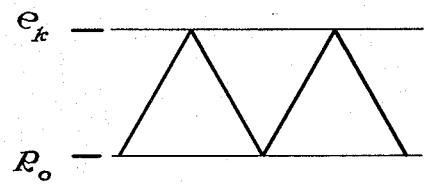
Figure 2:
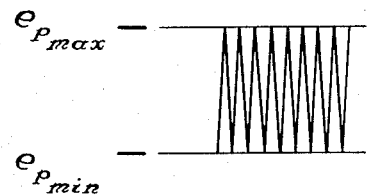
Figure 2:
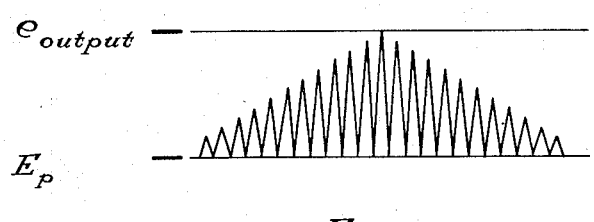

The relative characteristics of the various pulses referred to above are graphically indicated in Figure 2. Chart A in Figure 2 shows the form of the step wave output from two mode circuit 20 which is impressed upon the input element of integrator 21. The said step wave rises or falls to the point at which said two mode circuit 20 changes from one mode of balance to the other. Chart B indicates the wave form resulting from passing step pulses through integrator 21; the slope of the linear output depicted being positive or negative in response to the direction of the input step pulse. Thus if the input step pulse is negative as shown in the lower half of chart A, the integrator output takes the form shown in the lower half of chart B.

When operation of the system is continuous, the output from integrator 21 takes the cyclically rising and falling form shown in chart C, which output is simultaneously impressed on limiter 22 (Figure 1) and back to two mode circuit 20.

The sharp pulses put out by oscillator 23 are shown in chart D of Figure 2. These are of substantially constant height but need only be above a predetermined minimum inasmuch as deviations in height are automatically wiped out by the passage of such pulses through limiter 22 as noted hereinabove. When the pulses shown in charts C and D are mixed in limiter 22, the resultant is a succession of cyclically varying output pulses which follow the pattern predetermined by the elements chosen in the construction of two mode circuit 20. This resultant is shown in chart E and is substantially the same as the output from amplifier 24.

Figure 3:
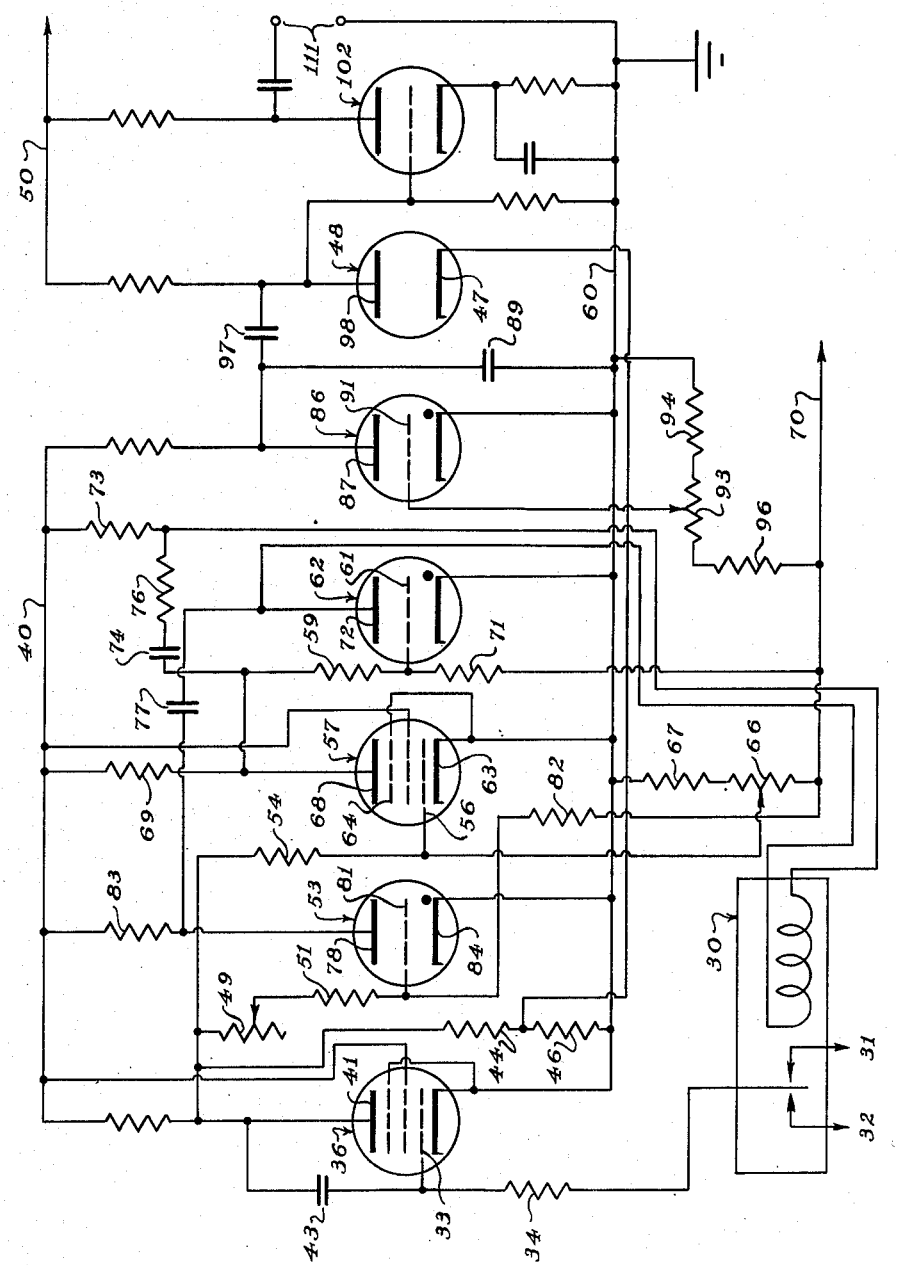
Figure 3 is a schematic diagram of a presently preferred embodiment of the present invention.

For a more detailed description of the present invention, reference is made to Figure 3 wherein a schematic wiring diagram of a presently preferred embodiment is given, it being understood that variations of the same may be constructed without departing from the spirit and scope hereof. In Figure 3, the role of the two mode circuit 20 (Figure 1) is carried out largely by relay 30 and associated electron discharge devices noted in detail hereafter. Relay 30 is a direct current, two position type, preferably rated to operate on low anode current, and adapted to have applied thereto suitable direct current positive and negative potentials as for example through contactors 31 and 32. For the purposes of the present description a negative potential is deemed applied to contactor 31 and a positive potential to contactor 32. Thus, in either position a pulse (substantially vertically rising or falling depending on the polarity), is produced which is impressed through grid leak resistor 34 to the grid 33 of pentode type tube 36 the operation of which will be given in more detail hereinafter.

Looking for the moment at tubes 53 and 62 it is noted that they are thyratron type tubes and that the manner of association thereof is such that when one tube is conducting the other is quenched and vice versa. The cathodes of both said tubes are maintained at ground potential 60 and the anode 78 of tube 53 is maintained at a suitable potential by connection through resistors 83 to the positive potential conductor 40. The anode 72 of thyratron type tube 62 is maintained at a positive potential by connection through relay 30 and resistor 73 connected in series and to the positive potential conductor 40. The input to tube 53 is applied to grid 81 through the series resistance 51 and variable resistance 49, whereas the input to tube 62 is applied through the inverter pentode 57 to grid 61, tubes 57 and 62 being resistance coupled through resistance 59. The input to both thyratron tubes 53 and 62 is derived from a connection to the anode of tube 36 as follows: the grid of tube 53 is connected through resistors 49 and 51, and control grid 56 of tube 57 is connected to anode 41 through resistor 54, the inverted signal then being applied to grid 61 of tube 62 through resistor 59. The inverter arrangement of tube 57 is conventional, i. e. cathode 63 and suppressor 64 are connected to ground, and control grid 56 is connected to a variable resistance 66 which, together with series resistor 67, is connected between ground and a source of suitable negative potential indicated by conductor 70. The arrangement just described with respect to control grid 56 permits tube 57 to be operated at the correct potential for firing tube 62 upon the reception of a suitable negative pulse. With tubes 53, 57 and 62 being thus associated and assuming tube 53 to be in the fired condition and tube 62 in the quenched condition, a negative linear signal applied to control grid 56 of tube 57 will cause anode 68 to rise in potential and thus apply a positive signal to control grid 61 of tube 62. It will be recalled that grid 61 is biased negatively by the connection through resistor 71 to the source of negative potential indicated by conductor 70, so that a positive signal appearing at grid 61 causes the said thyratron 62 to fire and thus draw anode current and actuate relay 30. When tube 62 is fired, tube 53 is quenched by the connection between anode 72 and anode 78 of tube 53 through condenser 77. Tube 62 will continue in its fired condition for a time fixed by the R. C. network including condenser 74 and resistor 76 and thus relay 30 will continue in its changed position, i. e. at contact 31 for this period.

When relay 30 has contact 31 closed a negative step wave is impressed on control grid 33 of tube 36. The presence of condenser 43, connected between anode 41 and grid 33 results in integration of an input signal and thus causes anode 41 to become more positive in a linear manner. The positive linear signal thus produced is impressed on control grid 81 of tube 53 through variable resistance 49 and series resistance 51. Variable resistance 49 is employed to control the pulse level at which tube 53 fires. Control grid 81 is maintained at a negative potential by the connection through resistor 82 to a source of negative potential, e. g. conductor 70. Cathode 84 may be connected to ground as shown because control grid 81 is maintained at a fixed bias. When thus connected, tube 53 will fire when the positive linear pulse formed by tube 36 and impressed on grid 81 reaches a predetermined level and quenches tube 62 in the manner described above in connection with the quenching of tube 53 by the firing of tube 62.

Thyratron type tube 86 is employed as a relaxation oscillator to provide sharp pulses of a predetermined amplitude and frequency. The connection of tube 86 in the circuit is well known with anode 87 maintained at a positive potential and condenser 89 providing a discharge path between said anode and ground. Control grid 91 is connected to variable resistor 93 which is part of the voltage divider including resistors 94 and 96 connected between the negative voltage supply 70 and ground. Variable resistor 93 thus provides means for varying the output frequency of the oscillator.

The output from oscillator 86 is impressed through condenser 97 on the anode 98 of diode tube 48 connected as a limiter. Anode 98 is maintained at a fixed positive potential derived from supply conductor 50. Thus, as cathode 47 rises and falls in potential in response to the linear output of tube 36 which is tapped off between resistors 46 and 44, the pulses from oscillator 86 are clipped at predetermined heights in conformance with the cyclic variation of the said output of tube 36. The limited pulses, in the embodiment shown are fed through amplifier tube 102 (which is also connected in the circuit in a well known manner) to output terminals 111.

It will thus be seen that what has been described is a system for providing cyclically varying pulses of a predetermined height and frequency, and a presently preferred embodiment of such a system. Obviously many variations in the circuit components may be introduced by one skilled in the art without departing from the spirit and scope of the present invention. For example, the two mode system described may be readily replaced by circuit elements connected in the manner of the Schmitt trigger circuit and oscillators of various type may be employed in place of oscillator 86. Thus, while these and other variations may suggest themselves to one skilled in the art, the scope of the present invention should not be limited except as such limitations may appear in the appended claim.

What is claimed is:

A signal generator for generating high frequency wave energy having a modulation envelope of cyclically repeating linear rise and decay, comprising a source of substantially constant level, high frequency electrical wave energy, a utilization channel, means electrically coupling the source of wave energy to the utilization channel, a diode having an anode and a cathode, said diode anode being connected to a first side of the utilization channel; a source of potential having a cyclically repeating linear and equal rate of rise and decay, comprising a thermionic tube having at least a cathode, a grid and an anode, said cathode being connected to the second side of the utilization channel, a resistor connected in shunt with the interelectrode space between the thermionic tube cathode and anode, a connection from a point on said resistor to said diode cathode, a first and second source of constant potential, the potential of said sources of constant potential having different magnitudes, means for impressing the first and second sources of constant potential alternately across the grid and cathode of said thermionic tube, means for integrating the impressed potentials on the same grid comprising an integrating network connected to the anode and grid of said thermionic tube, whereby a potential having a linear rise and fall is generated across said resistor between the said connection and the thermionic tube cathode and is impressed in series with the diode across said utilization channel so that the wave energy passing out of the utilization channel has a linearly rising and falling envelope.

HANS H. STAUB.

REFERENCES CITED

The following references are of record in the file of this patent:

UNITED STATES PATENTS

| Number | Name | Date |
| --- | --- | --- |
| 1,887,237 | Finch | Nov. 8, 1932 |
| 2,227,596 | Luck | Jan. 7, 1941 |
| 2,280,707 | Kell | Apr. 21, 1942 |
| 2,398,097 | Kent | Apr. 9, 1946 |
| 2,434,936 | Labin et al. | Jan. 27, 1948 |
| 2,445,233 | Montgomery | July 13, 1948 |
| 2,490,026 | Buckbee | Dec. 6, 1949 |